UNITED STATES PATENT OFFICE.

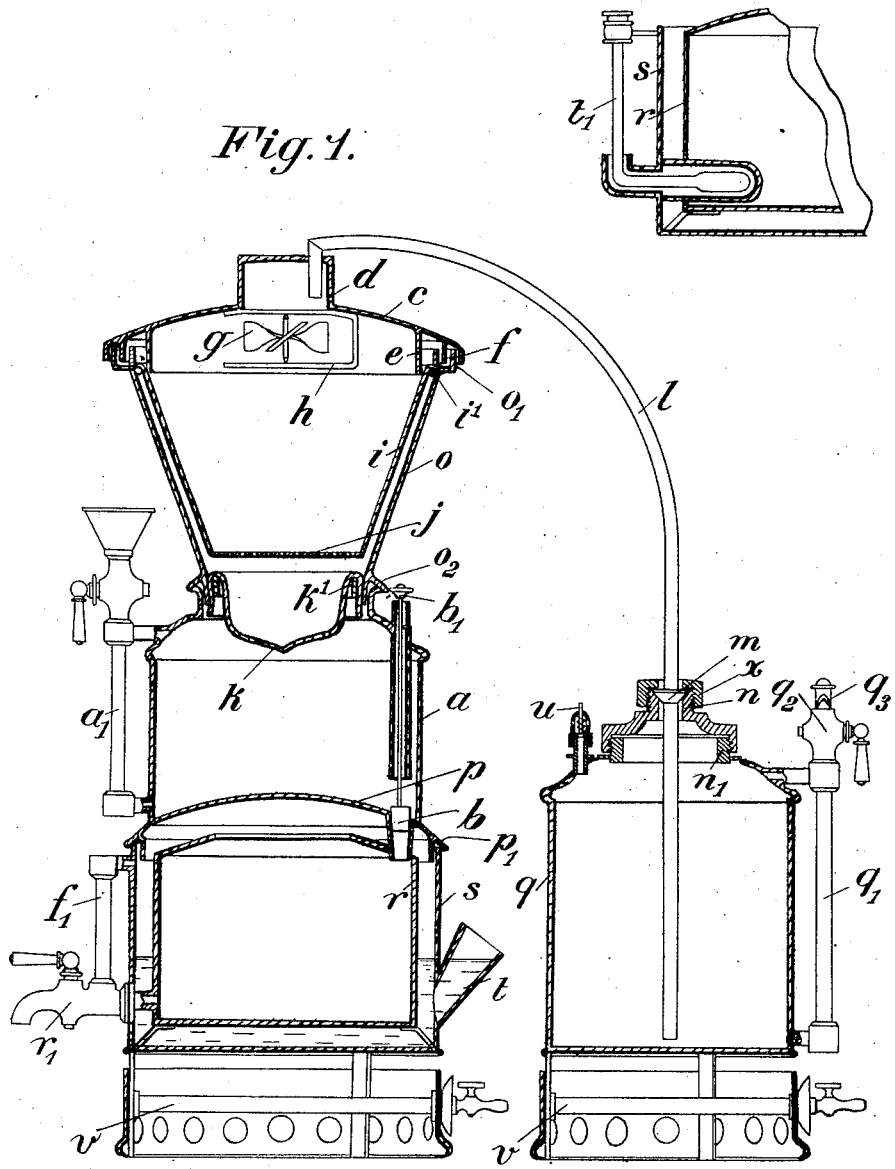

MARCELINO BARGALLÓ, OF BARCELONA, SPAIN.

COFFEE-MAKING APPARATUS.

1,003,317.  Specification of Letters Patent.  Patented Sept. 12, 1911.

Application filed January 21, 1910. Serial No. 539,223.

*To all whom it may concern:*

Be it known that I, MARCELINO BARGALLÓ, manufacturer, subject of the King of Spain, residing at Barcelona, in the Province of Barcelona and Kingdom of Spain, have invented certain new and useful Improvements in Coffee-Making Apparatus; and I do hereby declare the following to be a full, clear, and exact description of the invention, such as will enable others skilled in the art to which it appertains to make and use the same.

My invention embodies certain new and useful improvements in the apparatus for making coffee-decoction, in order that: 1st. all the parts of the apparatus may be easily set up and taken apart; 2nd. that the water may fall down under a certain pressure, to be readily distributed upon the coffee; 3rd. that the coffee-reservoir and the filters are so arranged that they may be easily taken apart and cleaned at any time; 4th. that a new decoction of coffee may be prepared before the old one is exhausted, the latter being kept hot.

I obtain this result by means of my improved apparatus suitably arranged as hereinafter described and represented in the annexed drawing, Figure 1 being a sectional elevation of the coffee-making apparatus and Fig. 2 a detailed section thereof.

This improved coffee-making apparatus is formed of three parts, viz: the conical shaped body $i$ for containing the ground coffee, the filters $j$ $k$, the cover $c$, the chamber $a$ to receive the decoction and the receptacle $r$ surrounded by a water casing $s$ in which receptacle the decoction is kept warm. A water supplying receptacle such as $q$ or other suitable kind may be used in connection with the apparatus. In order to provide a good joint for said parts, the upper body forms a groove to engage the mouth of the lower body, so that the former is merely set upon the latter; the cover $c$ is furnished with a double groove $e$ $f$ wherein the walls of the groove $o_1$ of the upper body $o$ penetrate; the upper body $o$ forms a groove $o_2$ and the chamber $a$ forms a groove $p_1$, so that the apparatus may be quickly and easily taken apart to be cleaned and set up again.

In order to supply the water at a certain pressure, there is a receptacle $q$ independent from and in connection with the apparatus by means of a pipe $l$ leading from near the bottom of said receptacle to the upper part of the cover $c$. The receptacle $q$ is closed and also the inlet for the tube $l$ is closed by a conical collar $m$ bearing on a conical seat arranged in the cover $n$ which is screwed on the threaded mouth $n_1$ of the receptacle. Said tube is held firmly in place by means of a nut $x$. The receptacle $q$ is fitted with a level tube $q_1$ a cock $q_2$ and a whistle $q_3$ in order to know when the water is boiling. The receptacle is further provided with a safety valve $u$ at the upper part and with a gas burner $v$ under the bottom. As the water is heated it tends to evaporate and the steam pressure thus generated forces the water up through the pipe $l$ which discharges it into the upper part of the cover $c$ of the apparatus.

In order to spread the water a fan $g$ is rotarily mounted on a support $h$ fixed to the inner face of the cover $c$, and as the pipe $l$ discharges the water on the inclined paddles of the fan $g$, the latter is caused to rotate and this revolving action spreads the water and converts it into rain drops which fall upon the coffee. This is a decided advantage over those devices in present use, as it allows the water to fall over a greater area of coffee, and therefore tends to give the coffee a gradual wetting, which has proved more advantageous in the quality of coffee produced in the present apparatus than in the other devices.

The upper body $o$ is conical in shape and has within it a similar conical shaped body $i$. The body $o$ is open below, and the inner body $i$ containing the ground coffee is closed below by means of a perforated bottom $j$. The upper edge of the inner receptacle is bent at $i'$ to be sustained in the upper body $o$. At the lower part of the upper body is a ring $k'$, suitably held in place by the conical walls of the upper body, and to this ring is secured a straining bag of felt or other suitable material.

The chamber $a$ is fitted with a level tube $a_1$ in order to know the height of the coffee decoction contained therein. Its bottom $p$ projects outwardly and forms a groove $p_1$ bearing on the mouth of the water casing $s$; within said casing there is the receptacle $r$ communicating with the chamber $a$ through an opening which is normally closed by a valve or plug $b$ arranged on the end of a rod $b_1$. The receptacle $r$ is fitted with an outlet cock $r_1$ through which the coffee decoction is discharged from said receptacle; a level tube $f_1$ is also provided to know the height of the liquid contained therein.

The receptacle $r$ may be also provided with a thermometer $t_1$, having the bulb located in the liquid contained in the receptacle, while the figures of the thermometrical scale are printed outside the apparatus, as shown in Fig. 2; in order that the operator may know at any moment the temperature of the coffee decoction contained therein and to keep it constantly at the proper temperature. The water casing $s$ is fitted with an inlet opening $t$ for the water.

The operation of the apparatus is as follows: After placing the ground coffee in the conical shaped body $i$, and after filling the water casing $s$ with the desired amount of water to form the hot bath, the reservoir $q$ is filled with water to produce the decoction, and when the tube $1$ is replaced in its proper position, the receptacle $q$ is heated. When the steam produced in the receptacle $q$ reaches a certain pressure, the whistle $q_3$ blows and if the cock $q_2$ is now closed, the inner pressure will force the water up through the pipe $l$ which will discharge it on the fan $g$ whereby it is finely divided into rain drops which fall upon the ground coffee. After the water has passed through the ground coffee and through the filters $j$ and $k$ it fills the chamber $a$ of the apparatus and then, by lifting the valve $b$ the liquid will fall into the receptacle $r$ wherein it is stored or kept in good condition for use at any time. The coffee decoction is drawn out through the cock $r_1$.

One of the advantages of the apparatus above described, is that while the coffee-decoction is kept hot in the receptacle $r$, it will be possible to prepare a new decoction by changing the exhausted coffee for a fresh quantity of same and after replenishing the body $q$ with water, the operations may be repeated as described.

Having thus described my invention what I claim and desire to secure by Letters Patent, is:

1. In a coffee making apparatus, the combination of an upper body, an inner body within the upper body and having a perforated bottom for supporting ground coffee, a straining bag carried by the upper body below the perforated bottom of the inner body, a cover for the upper body, means for supplying hot water through the top of the cover, a chamber below the upper body for receiving the water after passing through the ground coffee, a receptacle below the chamber, means for permitting the decoction to enter the receptacle, and means for keeping the decoction in the receptacle warm, substantially as described.

2. In a coffee making apparatus, the combination of an upper body, an inner body within the upper body and having a perforated bottom for supporting ground coffee, a straining bag carried by the upper body below the perforated bottom of the inner body, a cover for the upper body, means for supplying hot water through the top of the cover, a fan rotatably mounted within the cover for spreading the water, a chamber for receiving the hot water after passing through the ground coffee, the upper body being movably fitted to the chamber, a receptacle below the chamber, a valve for controlling the flow of the decoction from the chamber to the receptacle, a water casing surrounding the receptacle, means for heating the water in the casing to keep the decoction in the receptacle warm, and an outlet cock for the receptacle, substantially as described.

In testimony whereof, I affix my signature, in presence of two witnesses.

MARCELINO BARGALLÓ.

Witnesses:
CONSTANTINO LOPER CID,
JAIME PUJOL TORRENTS.

---

Copies of this patent may be obtained for five cents each, by addressing the "Commissioner of Patents, Washington, D. C."